United States Patent [19]
Torikai et al.

[11] 3,959,453
[45] May 25, 1976

[54] METHOD FOR MANUFACTURE OF SINGLE CRYSTALS β-PbO₂ AND SLENDER SINGLE CRYSTALS OF β-PbO₂ PRODUCED THEREBY

[75] Inventors: Eiichi Torikai, Yao; Yoji Kawami, Kawachi-Nagano, both of Japan

[73] Assignee: Agency of Industrial Science & Technology, Tokyo, Japan

[22] Filed: Nov. 26, 1974

[21] Appl. No.: 527,434

[30] Foreign Application Priority Data
Dec. 4, 1973 Japan............................. 48-136363

[52] U.S. Cl................................ 423/619; 423/93
[51] Int. Cl.².......................................... C01G 21/02
[58] Field of Search................ 423/618, 619, 92, 93

[56] References Cited
UNITED STATES PATENTS

| | | | |
|---|---|---|---|
| 1,915,724 | 6/1933 | Finkelstein............................ | 423/619 |
| 3,033,908 | 5/1962 | Darland, Jr............................ | 423/619 |
| 3,644,090 | 2/1972 | Beecken............................... | 423/619 |

FOREIGN PATENTS OR APPLICATIONS

| | | | |
|---|---|---|---|
| 697,068 | 10/1940 | Germany | |
| 8,087 | 1970 | Japan................................. | 423/619 |
| 8,086 | 1970 | Japan................................. | 423/619 |

OTHER PUBLICATIONS

Richard A. Baker, "Formation of α or β lead dioxide during the anodic oxidation of lead" J. Electrochem. Soc. 109, 337–338, (1962).

S. S. Tolkachev, "Structure of β–PbO₂," Vestnik Leningrad Univ. 13, No. 4, Ser. Fiz. i Khim, No. 1, 152–153, (1958).

Kordes, "Characterization of Positive Plates in Lead Batteries through X-ray irradiation," Chem. Ingr. Tech. 38(6), 638–642 (1966) (Ger.).

*Primary Examiner*—Oscar R. Vertiz
*Assistant Examiner*—Wayne A. Langel
*Attorney, Agent, or Firm*—Oblon, Fisher, Spivak, McClelland & Maier

[57] ABSTRACT

Single crystals of β-PbO₂ are formed when an intermediate oxide of lead represented by the generic formula, PbO$_x$ wherein $x$ denotes a value falling in the range of 1.4 to 1.7, is heated in an aqueous alkali hydroxide solution under a pressure exerted by use of oxygen or an oxygen-containing gas. The single crystals are in the shape of slender rods, have a black color and have a metallic gloss.

6 Claims, 3 Drawing Figures

METHOD FOR MANUFACTURE OF SINGLE CRYSTALS β-PbO AND SLENDER SINGLE CRYSTALS OF β-PbO₂ PRODUCED THEREBY

BACKGROUND OF THE INVENTION

This invention relates to a novel method for the manufacture of single crystals of $\beta$-$PbO_2$ and to the slender single crystals possessed of a metallic gloss which are produced by the said method.

Lead dioxide is generally known as serving the purpose an anodically active substance in lead storage batteries. It also finds utility in various electronic materials.

For lead dioxide to be effectively put to such uses, it is prerequisite that the basic physical properties thereof be accurately determined in advance. For this purpose, lead dioxide is required to be in the form of single crystals. If this compound is put to the uses mentioned above in the form of single crystals, then there can be obtained products with notably improved quality. Further, availability of the compound in the form of single crystals can be expected to encourage development of new uses.

The lead dioxide which is usually available is a powdery substance produced by a chemical or electrolytic process or a polycrystalline substance formed by electrodeposition. It is, therefore, not suitable for the determination of basic physical properties.

The considerable discrepancy among the test results which have been reported in the past is attributable to the use of such unsuitable lead dioxide.

Nothing has so far been reported as to the manufacture of single crystals of lead dioxide. In the specification of German Pat. (DRP 697068), there is a description to the effect that PbO or $Pb(OH)_2$ as a starting material is treated in an aqueous alkali solution under the pressure of air or oxygen. This treatment is not directed to the production of single crystals of $PbO_2$. When the present inventors actually tried this treatment by following the procedure described in the preferred embodiments of said German patent, the product obtained was either $Pb_3O_4$ or powdery $PbO_2$ having a low degree of crystallinity. They have thus confirmed that the method disclosed therein cannot produce single crystals of $PbO_2$ aimed at by the present invention.

An object of this invention is to provide an easy and commercially feasible method for the manufacture of single crystals of $\beta$-$PbO_2$.

Another object of this invention is to provide a method for the manufacture of single crystals of $\beta$-$PbO_2$, which method is such that the raw material is readily available and the product is obtained in high yields.

Still another object of this invention is to provide a method for the manufacture of single crystals of $\beta$-$PbO_2$ uniform in size.

Yet another object of this invention is to provide slender single crystals of $\beta$-$PbO_2$.

SUMMARY OF THE INVENTION

To attain the objects described above according to the present invention, there is provided a method which comprises immersing an intermediate oxide of lead represented by the generic formula, $PbO_x$ wherein $x$ denotes a value falling in the range of 1.4 to 1.7, in an aqueous alkali hydroxide solution placed as in a high-pressure container, exerting pressure on the mixture by use of oxygen or an oxygen-containing gas and at the same time heating at a temperature in the range of from 230° to 280°C and retaining the mixture under these conditions a prescribed length of time for to give rise to single crystals of the final product. The aforementioned intermediate oxide of lead does not include $Pb_2O_3$. The lead dioxide obtained by the method described above is a crop of black, slender single crystals of $\beta$-$PbO_2$ having a metallic gloss. The yield of this product based on the oxide of lead as the raw material is approximately 90%. The single crystals of the product are substantially uniform in size.

Other characteristics of the present invention will become apparent from the following description given with reference to the accompanying drawing.

DETAILED DESCRIPTION OF THE INVENTION

Figure 1:
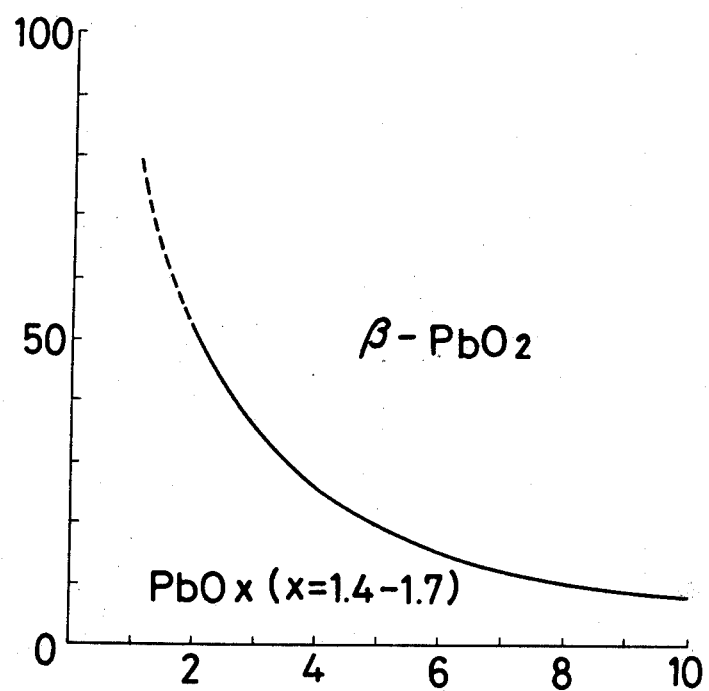
FIG. 1 is a graph showing the relation between the pressure of oxygen and the potassium hydroxide concentration as observed in producing slender single crystals by heating $pbO_{1.60}$ in an aqueous solution of potassium hydroxide under the pressure of oxygen.

Generally oxides of lead include PbO, $Pb_3O_4$, $Pb_2O_3$, $Pb_{12}O_{17}$, $Pb_{12}O_{19}$, $PbO_2$, etc. Of these oxides of lead, those represented by the generic formula $PbO_x$ wherein $x$ denotes a value falling in the range of 1.4 to 1.7, are usable as the raw material for the present invention. These are oxides of lead which fundamentally possess the structural formula of $Pb_{12}O_{17}$ or $Pb_{12}O_{19}$. Those usable for the invention, however, are not limited to the theoretical compositions of $PbO_{1.42}$ and $PbO_{1.58}$ but are inclusive of non-stoichiometric compounds possessed of the formula $PbO_x$ (wherein $x$ is a value falling in the range of 1.4 to 1.7) and capable of assuming the structures represented by the generic formulas of $Pb_{12}O_{17}$ and $Pb_{12}O_{19}$. Although $Pb_2O_3$ corresponds to $PbO_{1.5}$, it fails to produce the single crystals of $\beta$-$PbO_2$ even if it is treated by the method of this invention.

The reason for this will be described herein below. The formation of $PbO_2$ from $PbO_x$ is accomplished by the oxygen-addition reaction carried out under hydrothermal conditions as will be described herein below. $Pb_2O_3$ has a stoichiometric composition and, compared with $Pb_{12}O_{17}$ and $Pb_{12}O_{19}$, possesses an oxygen-packing structure of desirable structural symmetry. Consequently, it is less susceptible to oxygen-addition reaction.

In contrast, such oxides as $Pb_{12}O_{15}$ and $Pb_{12}O_{19}$ have an oxygen-packing structure of low structural symmetry and therefore readily undergo oxygen addition by the hydrothermal reaction.

In the case of $Pb_3O_4$, PbO and other lower oxides of lead, $PbO_2$ in the form of single crystals cannot be obtained by the method of this invention.

A $PbO_x$ (wherein $x$ is 1.4 to 1.7, with the proviso that $Pb_2O_3$ is excluded) (this definition of PbO will apply invariably herein after) which is used for the method of this invention can easily be produced by heating commercially available powdery $PbO_2$ in the air to 350° – 380°C. The value of $x$ in $PbO_x$ is variable with the temperature and duration of said heating. To be specific, $x$ assumes a high value when the heating is given at a temperature in the lower part of the specified range for a short period. It assumes a low value when the heating is performed at a temperature in the higher portion of said range for a long time. The $PbO_x$ which is consequently obtained with $x$ in the range of 1.4 to 1.7 is confirmed by the X-ray diffraction method to have a rather broad structure of $P_{12}O_{19}$.

The $PbO_x$ thus obtained is now placed in an aqueous alkali hydroxide solution and heated under a pressure exerted by use of a gas containing at least 20% by volume of oxygen.

This application of pressure is desirably effected by use of oxygen. Use of a gas containing at least 20% by volume of oxygen such as, for example, air is permissible for this purpose. Use of a gas containing oxygen by less than the percentage described above is impracticable because the oxidation proceeds at a rate lower than is required. The reaction according to this method is usually desired to proceed at temperatures in the range of 230° to 280°C. At temperature falling outside this range, the proportion of $PbO_x$ which remains in its unaltered form increases and the yield of single crystals of lead dioxide is consequently lowered. The yield of the product is particularly high when the reaction temperature falls in the range of 250° to 270°C. The reaction is generally required to last for a period of 24 to 96 hours for advantageous results.

Examples of the alkali hydroxides which are usable for the present invention are sodium hydroxide, potassium hydroxide, lithium hydroxide, etc. The concentration of such alkali has bearing on the pressure of oxygen.

FIG. 1 is a graph showing the relation between the oxygen pressure and the alkali concentration as observed in producing slender rods of $PbO_2$ by treating $PbO_x$ ($x = 1.60$) as the raw material in the aqueous KOH solution at temperatures of 240° to 260°C under the pressure of oxygen. In this graph, the abscissa represents the KOH concentration in normality (N) and the ordinate represents the oxygen pressure in $kg/cm^2$. In this graph, the area below the curve represents the region of raw material and the area above the curve represents the region of formed slender rods of $\beta$-$PbO_2$. The graph indicates that the oxygen pressure need not be high where the alkali concentration is high and that the oxygen pressure must be increased where the alkali concentration is low. If the concentration of KOH is 2N, for example, the oxygen pressure is required to be at least 50 $kg/cm^2$. If the KOH concentration is 10N, approximately 10 $kg/cm^2$ of oxygen pressure will suffice. This relationship holds similarly in the reaction using NaOH as the alkali hydroxide.

Where lithium hydroxide is adopted herein as the alkali hydroxide, it is desired to be used at a concentration of not more than 5N because of its solubility.

In carrying out the melted of this invention a $PbO_x$ given as the raw material is placed in a corrosion-proof container of platinum, silver, etc. An aqueous alkali hydroxide solution is added thereto. The metal container is placed in an autoclave or some other high-pressure vessel, wherein the contents are heated under pressure of oxygen for a prescribed length of time. At the end of the treatment, the corrosion-proof metal container is taken out from the autoclave and the formed single crystals of $\beta$-$PbO_2$ are removed from the container, washed with water and dried.

Figure 2:
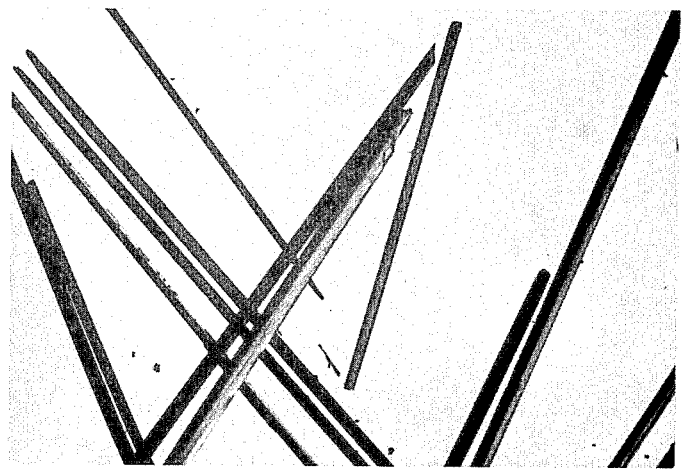
FIGS. 2 and 3 are electron photomicrographs (x 12) of the slender crystals of $\beta$-$PbO_2$ formed according to the present invention.
Figure 3:
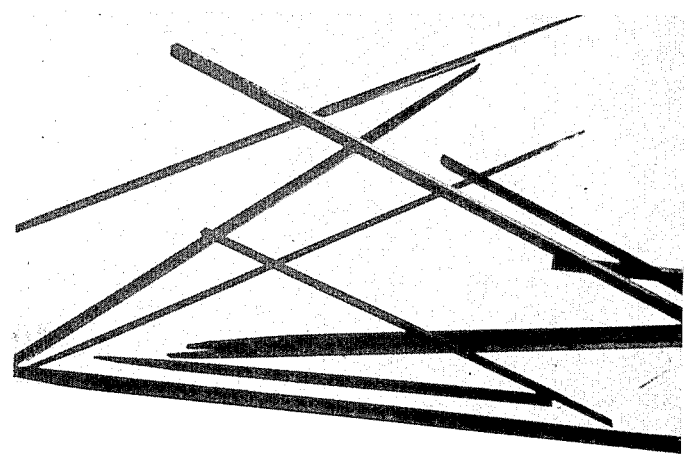

Thus is produced a crop of single crystals of $\beta$-$PbO_2$ measuring 0.2 to 1.0mm in apparent diameter and 5 to 15mm in length. As shown in FIGS. 2 and 3, they are black slender single crystals possessed of a metallic gloss. They have been confirmed to display a sharp diffraction curve characteristic of $\beta$-$PbO_2$ in the X-ray diffraction analysis.

Now, the effect of the present invention will be demonstrated by reference to a preferred embodiment herein below. It should be understood, however, that this invention is not limited to this example.

EXAMPLE

Oxides of lead, $PbO_{1.42-1.70}$, obtained by heating a commercially available $PbO_2$ at 360°C for 4 hours and at 380°C for 4 hours were used. The structures of $PbO_{1.42-1.70}$ were determined as follows. Their oxygen contents were found by the thermogravimetric method. The specimens of these oxides of lead were subjected to X-ray diffraction analysis and found to display diffraction pattern identical with the standard pattern of $Pb_{12}O_{19}$. Each specimen 12g in weight was placed in conjunction with 40ml of an alkali hydroxide solution having a different alkali concentration indicated below in a platinum container (measuring 23mm in diameter and 12mm in length and having an inner volume of 45ml). The platinum container with its contents was set in position in an autoclave (proof against up to 400°C of temperature and up to 250 $kg/cm^2$ of pressure, having an inner volume of 150ml and measuring 40mm in diameter and 125mm in height) and left to stand for 70 hours under pressure of oxygen or air at 30 to 100 $kg/cm^2$ at a temperature of 260° ± 5°C. During the reaction, the total pressure was 120, 150 and 225 $kg/cm^2$ respectively where the oxygen pressure was 30, 50 and 10 $kg/cm^2$. At the end of the reaction, the formed crystals were removed, washed with water and dried to obtain 10 to 11g of a crop of black, slender single crystals 0.4 to 1.0mm in diameter and 8 – 12mm in length. These black, slender single crystals displayed a sharp diffraction curve characteristic of $\beta$-$PbO_2$. The following table shows the specimens, reaction conditions and test results.

| Test No. | Specimen | X-ray diffraction | Alkali concentration | Oxygen pressure ($kg/cm^2$) | Air pressure ($kg/cm^2$) | Needle-shaped $\beta$-$PbO_2$ | |
|---|---|---|---|---|---|---|---|
| | | | | | | Yield (%) | Dimensions of formed single crystals (mm) |
| 1 | $PbO_x$ $x=1.60$ | $Pb_{12}O_{19}$ | 2N-NaOH | 100 | — | 78.5 | Diameter 0.3–0.5 Length 5 – 7 |
| 2 | " | " | 4N-NaOH | 50 | — | 87.5 | Diameter 0.5–0.8 Length 6 – 10 |
| 3 | " | " | 8N-KOH | 30 | — | 89.1 | Diameter 0.6–1.0 Length 8 – 12 |
| 4 | " | " | 4N-LiOH | 50 | — | 82.6 | Diameter 0.4–0.8 Length 6 – 8 |
| 5 | " | " | 8N-KOH | — | 100 | 84.5 | Diameter 0.3–0.6 |

| Test No. | Specimen | X-ray diffraction | Alkali concentration | Oxygen pressure (kg/cm²) | Air pressure (kg/cm²) | Needle-shaped β-PbO₂ Yield (%) | Dimensions of formed single crystals (mm) |
|---|---|---|---|---|---|---|---|
| 6 | PbO$_x$ x=1.42 | '' | 4N-NaOH | 50 | — | 85.0 | Length 4 – 6<br>Diameter 0.4–0.8<br>Length 6 – 8 |
| 7 | '' | '' | 8N-KOH | 30 | — | 86.5 | Diameter 0.5–1.0<br>Length 6 – 8 |

What is claimed is:

1. A method for the manufacture of single crystals of β-PbO₂ which comprises:

immersing a non-stoichiometric oxide represented by the formula PbO$_x$, wherein $x$ denotes a value falling within the range of 1.4 – 1.7, but excluding Pb₂O₃ and having the specific structural formula of Pb₁₂O₁₇ or Pb₁₂O₁₉ in an aqueous solution of an alkali metal hydroxide selected from the group consisting of sodium hydroxide, potassium hydroxide and lithium hydroxide;

heating said aqueous solution in which said lead oxide has been immersed to a temperature in the range of 230° – 280°C and at the same time exerting pressure thereon with a gas containing at least 20% by volume oxygen, thereby producing single crystals of β-PbO₂ in said aqueous solution; and thereafter separating said β-PbO₂ crystals from said aqueous solution.

2. The method of claim 1, wherein the oxide of lead represented by the generic formula of PbO$_x$ is produced heating a powdery PbO₂ in the air at temperatures of 350° to 380°C.

3. The method of claim 1, wherein oxygen is used as the gas.

4. The method of claim 1, wherein the alkali hydroxide is at least one member selected from the group consisting of sodium hydroxide and potassium hydroxide, and the concentration of the aqueous solution falls in the range of 4N to 10N.

5. The method of claim 1, wherein the aqueous alkali hydroxide solution is an aqueous lithium hydroxide solution having a concentration of not more than 5N.

6. Black column-shaped β-PbO₂ single crystals measuring 0.2 to 1.0 in diameter and 5 to 15mm in length and having a metallic gloss.

* * * * *